(12) United States Patent
Mehtonen

(10) Patent No.: US 7,284,762 B2
(45) Date of Patent: Oct. 23, 2007

(54) MULTIPURPOSE SLED

(75) Inventor: Pekka Mehtonen, Myllyniemi (FI)

(73) Assignee: T:MI Pekan Monipalvelu, Myllyniemi (FI)

( * ) Notice: Subject to any disclaimer, the term of this patent is extended or adjusted under 35 U.S.C. 154(b) by 0 days.

(21) Appl. No.: 10/565,728

(22) PCT Filed: Aug. 6, 2004

(86) PCT No.: PCT/FI2004/000471

§ 371 (c)(1),
(2), (4) Date: Jun. 9, 2006

(87) PCT Pub. No.: WO2005/014367

PCT Pub. Date: Feb. 17, 2005

(65) Prior Publication Data

US 2007/0035095 A1    Feb. 15, 2007

(30) Foreign Application Priority Data

Aug. 6, 2003   (FI) ............................... 20030285 U

(51) Int. Cl.
B62B 15/00 (2006.01)
B62B 17/06 (2006.01)

(52) U.S. Cl. ..................... 280/19.1; 280/845; 280/12.1

(58) Field of Classification Search ............... 280/21.1, 280/19.1, 23.1, 7.17, 14.21, 845, 24, 18, 280/14.1, 14.26–14.27; 135/901; D12/6, D12/8, 9

See application file for complete search history.

(56) References Cited

U.S. PATENT DOCUMENTS 3,820,805 A * 6/1974 Tuomala .................... 280/19.1
4,438,940 A * 3/1984 Hunt ......................... 280/19.1
4,526,391 A * 7/1985 Winkelman et al. ....... 280/19.1
4,631,877 A * 12/1986 Molodecki ..................... 52/70

FOREIGN PATENT DOCUMENTS

| CA | 2296120 | 4/2000 |
|---|---|---|
| GB | 2164297 | 3/1986 |

OTHER PUBLICATIONS

International Search Report No. PCT/FI2004/000471, dated Dec. 7, 2004, 2 pages.

* cited by examiner

*Primary Examiner*—Christopher P. Ellis
*Assistant Examiner*—Vaughn Coolman
(74) *Attorney, Agent, or Firm*—Connolly Bove Lodge and Hutz

(57) ABSTRACT

A multipurpose sled which comprises an upwards open container(1), which includes a bottom (15), a rear wall (16*a*, 16*b*, 16*c*), side walls (17) and a front wall (18), runners (2) which extend backwards over the container, and supporting means extending essentially as long as the runners for setting the sled on the back ends of the runners and the supporting means for using the sled as a shelter, is characterised in that it comprises handles (3) and means (7) for attaching the handles detachably to the rear part of the container in different positions for different purposes of use so that in a first position (P2) the handles (3, 3*a*) form said supporting means for setting the sled on the back ends (2*a*) of the runners and the supporting means for using the sled as a shelter.

9 Claims, 2 Drawing Sheets

MULTIPURPOSE SLED

FIELD OF THE INVENTION

The invention is related to a multipurpose sled which comprises an upwards open container, which includes a bottom, a rear wall, side walls and a front wall, runners which extend backwards over the container, and supporting means extending essentially as long as the runners for setting the sled on the back ends of the runners and the supporting means for using the sled as a shelter.

BACKGROUND OF THE INVENTION

U.S. Pat. No. 4,438,940 presents a sled which comprises a container, runners which extend backwards over the container and a supporting leg extending from the rear wall of the conainer essentially as long as the runners for setting the sled on the back ends of the runners and the supporting leg for using it as a shelter in ice fishing, for example. The support leg is fixed permanently to the rear wall of the container, and it has no other use than supporting the sled in the shelter position.

U.S. Pat. No. 4,526,391 presents a shelter portable on ice or snow comprising an integral body or shell having a shape of a jolly or deep sled and including a planar rear wall. Runners united into the integral body have been formed on the bottom. The meaning is to set the body into a shelter position on the rear wall. Besides that, the solution includes parts with which sheltering walls or a tent may be formed in connection with the body. The device is provided for being pulled and is meant particularly for use as a shelter. Besides that, some amount of goods may be transported with it.

SUMMARY OF THE INVENTION

An object of the invention is to provide an improved multipurpose sled which may be used also as a shelter.

To achieve this object, a multipurpose sled according to the invention which comprises an upwards open container, which includes a bottom, a rear wall, side walls and a front wall, runners which extend backwards over the container, and supporting means extending essentially as long as the runners for setting the sled on the back ends of the runners and the supporting means for using the sled as a shelter, is characterised in that what is deformed in the independent claim 1. Other claims define various embodiments of the invention.

The sled according to the invention suits well for transporting e.g. camping or fishing equipment, tools or firewood by pushing the sled. A rambler or winter fisher or an outdoor worker, like a forest worker, for example, may transport his or her equipment with the sled and at the same tima use it as a shelter and seat. The handles may be designed so that they extend far enough from the runners whereby the sled is well supported in the shelter position. On hard snow or ice, the sled may be used also as a kick sled. The sled may also be pulled by a snow mobile.

BRIEF DESCRIPTION OF THE DRAWINGS

The invention and some embodiments thereof are described in further detail in the following with reference to the accompanying drawings, in which.

DETAILED DESCRIPTION OF THE INVENTION

Figure 1:
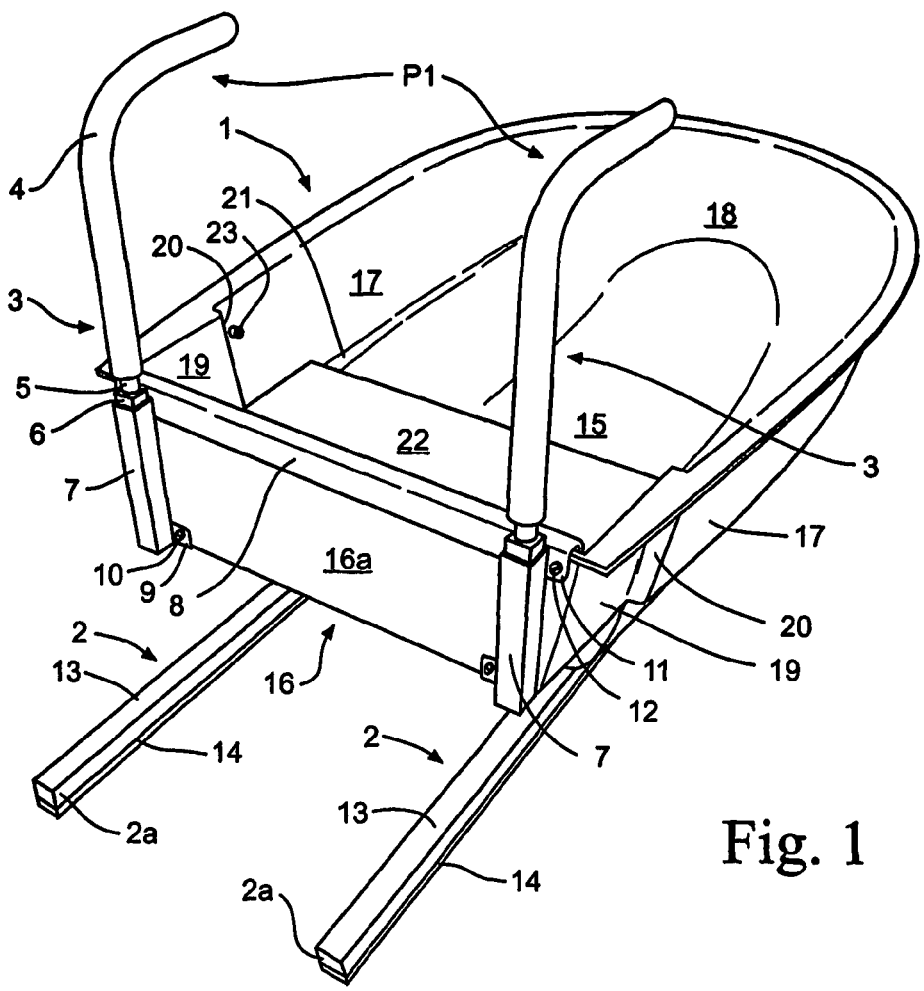
FIG. 1 presents an embodiment of the sled according to the invention in perspective.

A sled described in detail in FIGS. 1 to 6 comprises an upwards open container 1 having generally a shape of a jolly or deep sled and including a bottom 15, a rear wall 16a, 16b, 16c, side walls 17 and a front wall 18. Runners 2 have been attached to the bottom having ends 2a which extend over the rearmost part 16a of the rear wall. The runners include backwards extending beams 13 attached to the planar part of the bottom and sliding bottoms 14 fixed under the beams and extending at the front over the curved front wall.

Figure 2:
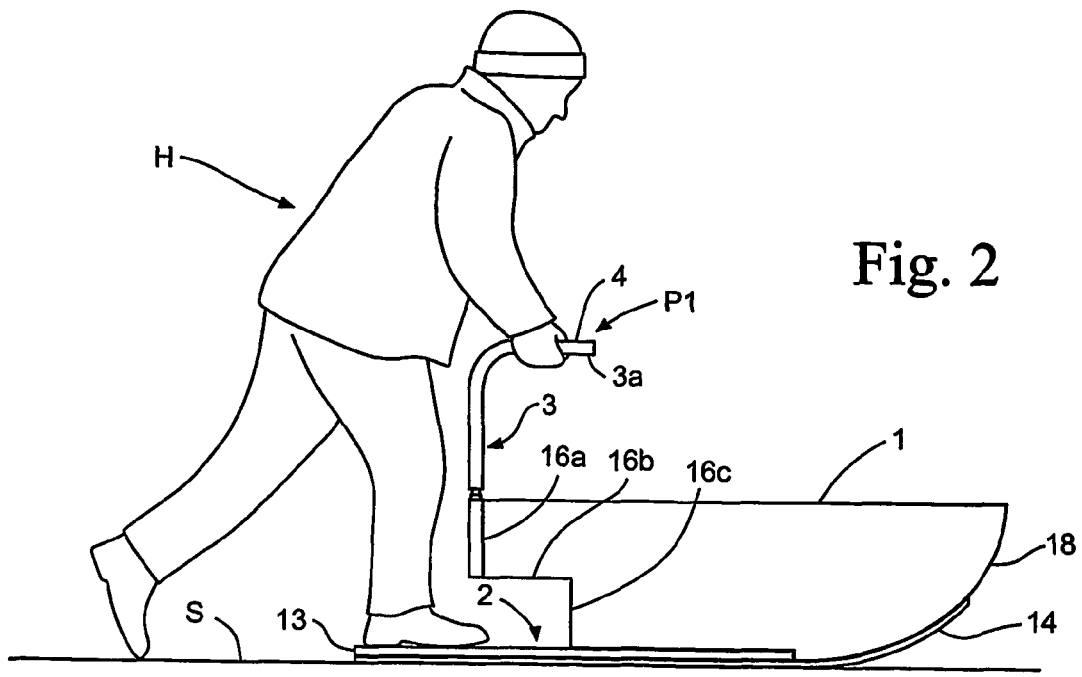
FIG. 2 presents schematically in side view the sled of FIG. 1 and a possible use of it.

Handles 3 have been attached to the rearmost upper part 16a of the rear wall. The lower part 16b, 16c of the rear wall is retracted whereby the sled may better be used also as a kick sled (FIG. 2). A rail 8 is attached to the upper edge of the rear wall 16a from which sleeves 7 extend downwards at both ends. The attachments to the rear wall have been made with plates 9, 11 and screws 10, 12.

Figure 3:
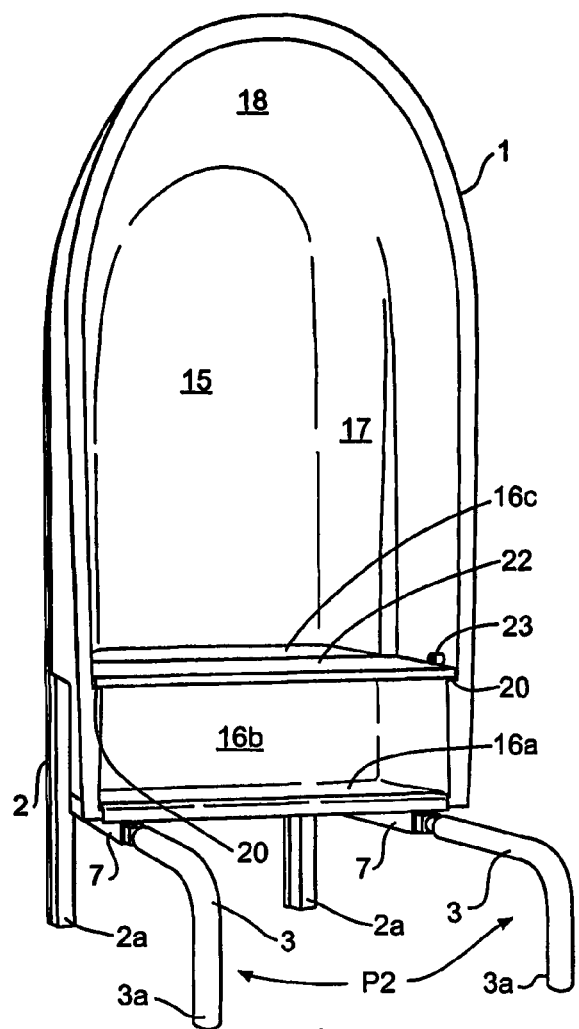
FIG. 3 is a perspective view presenting the sled of FIG. 1 in a shelter position.
Figure 4:
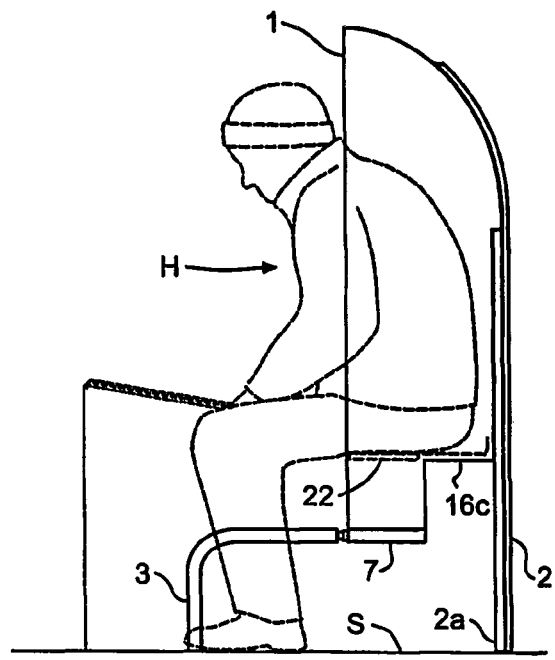
FIG. 4 presents schematically in side view the use of the sled of FIGS. 1 and 3 as a shelter.
Figure 6:
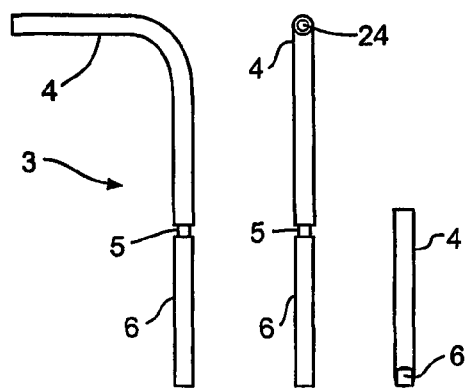
FIG. 6 presents a possible realization of the handle in side, front and end views, respectively.
Figure 5:
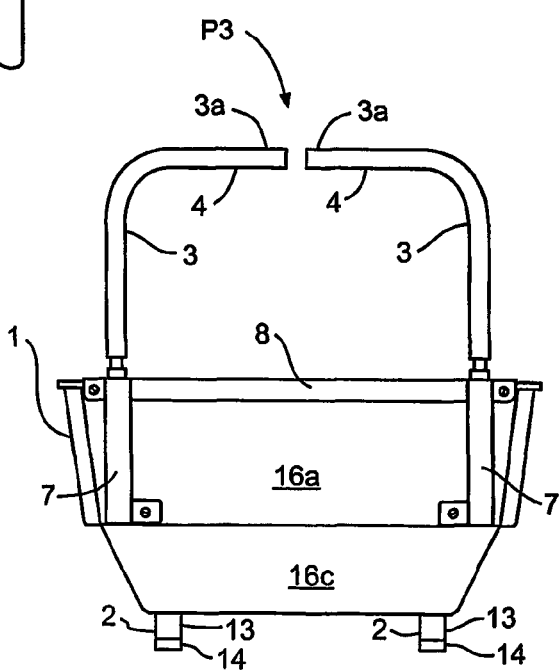
FIG. 5 presents the sled of FIGS. 1 and 3 in rear view the handles being in a further possible position.

The section of the sleeves 7 is a square. The handles 3 include an attachment portion 6 with the dimensions and shape which make it to fit the sleeve. From the attachment portion extends a round bar 5 curved to form a grip portion 4. The grip portion is coated with suitable plastic material, for example. The handle 3 may be set into four different positions in the sleeve. In FIGS. 1 and 2, the the grip portions are directed forward. In FIGS. 3 and 4, the grip portions are directed backward whereby the ends 3a of the handles extend essentially as long backwards as the ends 2a of the runners. In the example of FIG. 5, the grip portions 4 and the ends 3a of the handles are directed towards each other. The handles may be set also so that they are directed to the sides (not shown).

In the rear portion of the container 1, at a certain distance from the rear wall 16a, there have been formed inwards directed corners 20 against which a plate 22 may be set. From there forward also the lower portion of the container has been retracted so that narrow support surfaces 21 have been formed on the side walls. The plate 22 may be set also on these surfaces. The sled being in the pushing position, the plate 22 may be set also in upright position against the corners 20 whereby holders 23 support it on the other side. The plate is then separating a rear compartment for keeping there certain equipment, for example.

Preferably, the structures described above have been designed for the purpose that the plate 22 and the retracted portion 16c of the rear wall aligned with it form in the shelter position of the sled a seat at a suitable height (FIG. 4). On the other hand, in the pushing position of the sled the plate 22 set on the supporting surfaces 21 and the horizontal portion 16b of the rear wall form a seat, and the sled may be used for transporting a person either by pushing or by pulling the sled.

In the example of FIG. 2, a person H is using the sled as a kick sled on ice or hard snow S by holding the grip portions 4 of the handles directed forward (position P1). In the example of FIG. 4, the sled is in the shelter position and a person H is sitting partly inside the container 1 on the seat formed by the plate 22 and the wall 16c.

The invention is not restricted in the embodiments described above. It is obvious that the shape and the attachments of the handles may be realized in many different ways. The handles may be settable into more positions or freely into various positions, and their detachable attachment may be provided with suitable means for locking the handle into a desired position. Also in the examples presented above, the attachment of the handles is advantageously provided with locking which may be realized in various ways. The shape and the technical realization of the handles may vary widely. The angle between the attachment portion and the grip portion of the handle may be other than the right angle. The ends of the handles may be bent or otherwise suitably shaped.

The invention may vary within the scope of the accompanying claims.

The invention claimed is:

1. A multipurpose sled which comprises:
    an upwards open container (1), which includes a bottom (15), a rear wall (16a, 16b, 16c), side walls (17) and a front wall (18);
    runners (2) having back ends (2a) and extending backwards form the container; and
    supporting means extending essentially as long as the runners for setting the sled on the back ends of the runners and for using the sled as a shelter, wherein the sled comprises handles (3; 4, 5, 6) and means (7, 8, 9, 10, 11, 12) for attaching the handles detachably to a rear portion (16) of the container in different positions (P1, P2, P3) for different purposes of use so that in a first position (P2) the handles (3, 3a) from said supporting means for setting the sled on the back ends (2a) of the runners and for using the sled as a shelter.

2. A sled according to claim 1, wherein each of the handles (3) includes an attachment portion (6) and a grip portion (4) joining the attachment portion at in an angle.

3. A sled according to claim 2, wherein the grip portion (4) joins the attachment portion (6) at essentially a right angle.

4. A sled according to claim 1, wherein in a second position (P1) the grip portion (4) of the handles (3) is curved forward for pushing the sled or for travelling by the sled.

5. A sled according to claim 1, wherein in a third position (P1) the grip portion (4) of the handles (3) is curved towards each other for pushing the sled or for travelling by the sled.

6. A sled according to claim 1, wherein the means for attaching the handles detachably include vertical sleeves (7) attached to the rear wall (16a) of the sled which sleeves have been adapted for attaching the handles thereto detachably in different positions.

7. A sled according to claim 6, wherein each sleeve (7) has a regular polygonal cross section and each handle (3) includes an attachment portion (6), each attachment portion having a cross section corresponding to said cross section of each sleeve, wherein the attachment portion is adapted to fit into the sleeve.

8. A sled according to claim 7, wherein the regular polygonal cross section of each sleeve (7) is square cross section.

9. A sled according to claim 1, wherein the rear portion (16) of container is formed so that the means (7, 8, 10, 11, 12) for attaching the handles detachably are in an upper part (16a) of the rear wall and a lower part (16b, 16c) of the rear wall is retracted to aid in using the sled as a kick sled.

* * * * *